Sept. 18, 1962
B. G. KING
NEGATIVE RESISTANCE PULSE REGENERATOR
WITH UNIDIRECTIONAL REFLECTOR
Filed Dec. 29, 1960
3,054,906

INVENTOR
B. G. KING
BY
Harry C. Hart
ATTORNEY

United States Patent Office 3,054,906
Patented Sept. 18, 1962

3,054,906

NEGATIVE RESISTANCE PULSE REGENERATOR WITH UNIDIRECTIONAL REFLECTOR

Bernard G. King, Morristown, N.J., assignor to Bell Telephone Laboratories, Incorporated, New York, N.Y., a corporation of New York Filed Dec. 29, 1960, Ser. No. 79,238
6 Claims. (Cl. 307—88.5)

This invention relates to the regeneration of pulse signals propagated along a transmission path and more particularly to the accomplishment of such regeneration through the use of negative resistance diodes.

In the performance of logical operations the pulse signals that direct the operations must on occasion be transformed by being inverted in polarity and converted in duration. When the operations take place rapidly, the transmission path traversed by the signals becomes electrically extensive and the propagation behavior of the signals must be taken into account. Additionally, for an extensive path, transformed pulse signals may become excessively attenuated before reaching their points of destination. Accordingly, it is an object of the invention to restore the amplitudes of propagated pulse signals that are to be transformed in polarity and duration. A related object is to effect the transformations and the amplitude restorations simultaneously.

Usually, the amplitude restorations of the propagated signals take place in a regenerator that is capable of adopting any one of a multiplicity of distinctive signal levels. When the regenerator is bistate, as is typically the case, two such levels or states are involved.

Initially the regenerator is set in an equilibrium state by an energizing signal. Thereafter, an incoming pulse signal, exceeding a threshold level, sets the regenerator in an alternative signal state and initiates the generation of an outgoing signal whose polarity depends upon the way in which the regenerator is incorporated into the transmission path. Because of the regeneration, the outgoing signal amplitude is substantially unaffected by distortion of the incoming signal and the spontaneous disturbances added to it by the path.

If the outgoing signal is to have a leading edge with a desirably rapid rise-time, the regenerator must change abruptly from one signal state to another. This can be achieved through the use of a negative resistance device in general, and a negative resistance diode in particular. However, once a negative resistance device has been caused to change state, completion of regeneration requires that the device be returned to its initial signal state, as by the discharge of a storage component whose time constant with the device determines the regenerative interval. Besides adding complexity to the regenerator, a storage component creates the possibility that its impedance effects, taken with those of the negative resistance device, may lead to spurious oscillatory behavior.

Consequently, it is a further object of the invention to achieve inverted-polarity regeneration in a transmission path through the employment of a negative resistance device, particularly a diode, that is unaccompanied by an auxiliary storage component. A related object is to control the regenerative interval of the device in the absence of such a storage component.

Often a negative resistance device, such as a diode, is bilateral in that changes in signal state produce a reverse propagation along the transmission path, as well as the desired forward propagation. This reverse propagation can lead to interference with oncoming pulse signals.

Accordingly, it is a still further object to curtail the reverse propagation associated with the changes in state of a bilateral negative resistance device. A related object is to coordinate the curtailment of reverse propagation and the control of the regenerative interval.

The invention accomplishes the above and related objects by incorporating both a negative resistance device and a unidirectional reflector into a transmission path. Since the resistance device displays at least one threshold-terminated region of negative resistance, it responds to an initiating pulse signal that exceeds the threshold even though attenuated in the course of propagation. As a result, the device experiences a transition through its negative resistance region and launches inverted and non-inverted signals of enhanced amplitude that are, respectively, forwardly and backwardly propagated. When the device is a negative resistance diode, it is integral with one of the conductors of the transmission path and poled in the direction of forward propagation.

Through inclusion of the unidirectional reflector preceding the negative resistance device, the invention provides for the substantially unimpeded passage of the initiating pulse signals while causing each backwardly propagated signal to be reflected, inverted in polarity and returned to the negative resistance device where, because of its inverted polarity, it re-establishes the initial equilibrium signal state of the device. Thus, the reflector both curtails the reverse propagation and controls the regenerative interval of the negative resistance device.

It is a feature of the invention that the transmission path, which may take the form of a coaxial cable, is energized from its extremities. Another feature resides in the adjustment of the path interval between the reflector and regenerative component to regulate the duration of the regenerative interval.

Other features of the invention will become apparent after the consideration of an illustrative embodiment, taken in conjunction with the drawings in which.

Figure 1:
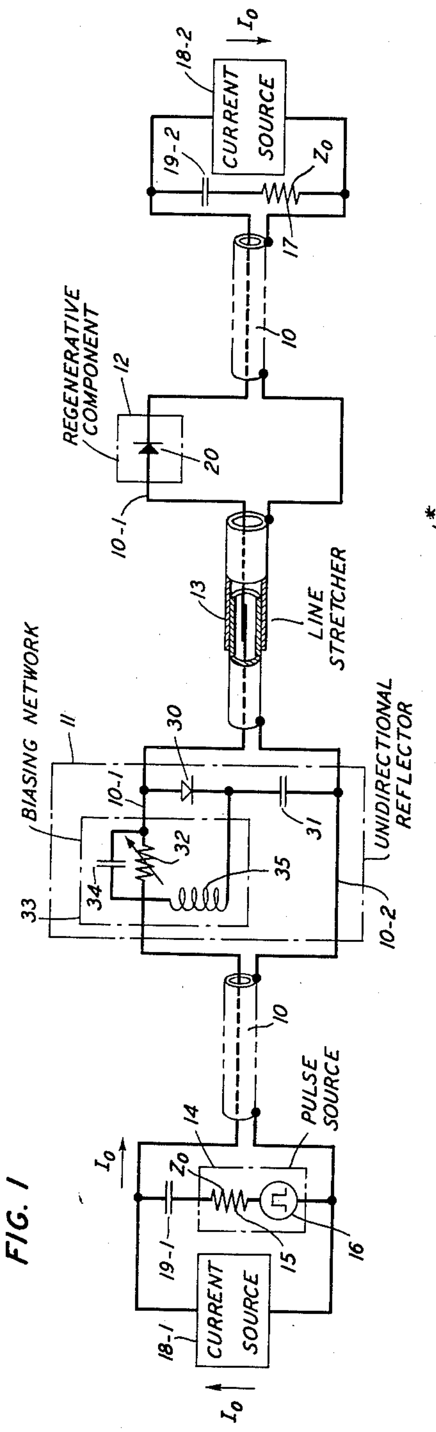
FIG. 1 is a schematic and block diagram of a transmission line pulse regenerator employing a voltage-controlled diode.

Turn now to FIG. 1 showing a regenerator constituted of a dual conductor transmission path, such as a coaxial line 10, that includes a unidirectional reflector 11 and a regenerative component 12. The reflector 11 precedes the regenerative component 12 and is separated from it by a line stretcher 13. As for the transmission path 10, it extends between a source 14 of pulse signals, represented by a series combination of a resistor 15 and a voltage source 16, and a load 17. To insure maximum transfer of pulse signal energy, the impedance $Z_0$ of the load 17 and that associated with the source 14 are matched to the characteristic impedance $Z_0$ of the path 10.

Energizing power supply signals for the regenerator are provided from the extremities of the path 10 by, for example, constant current sources 18–1 and 18–2, which are isolated from the pulse source 14 and the load 17 by respective blocking capacitors 19–1 and 19–2.

The regenerative component 12 is desirably a voltage-controlled negative resistance diode 20 that is directly incorporated into one of the conductors 10–1 of the transmission path 10.

Since the reflector 11 must be substantially unidirectional, it advantageously affords diverse conduction properties in the forward and reverse directions of signal propagation along the transmission path 10. Typically, the principal constituent of the reflector 11 is a diode 30 that interconnects the path conductors 10–1 and 10–2 and is isolated from the energizing signal sources 18–1 and 18–2 by a blocking capacitor 31.

The reflector diode 30, which has a current-voltage characteristic with distinctive intervals of conduction and non-conduction separated by a threshold of conduction, may be of the ordinary rectifying variety. However, when high pulse rates are to be accommodated, the reflector diode 30 may be of the voltage-controlled variety used in the regenerative component 12, as resistively bypassed to eliminate its negative resistance behavior in accordance with the teaching contained in the copending application of M. E. Karnaugh, Serial No. 62,011, filed October 11, 1960. Or the reflector 11 may employ the so-called backward diode disclosed in the copending application of F. H. Tendick, Serial No. 64,173, filed October 21, 1960.

In any case, the reflector diode 30 is poled in its conduction direction with respect to positive-going pulse signals that emanate from the source 14, but it is biased into the non-conduction interval of its current-voltage characteristic by the development of a steady biasing voltage across the adjustable resistor 32 of the biasing network 33 that precedes the rectifying diode 30. With respect to pulse signals, the biasing resistor is bypassed by a capacitor 34 and isolated from the rectifying diode 30 by an inductor 35, through which the steady biasing voltage is manifested at the diode 30.

Figure 2:
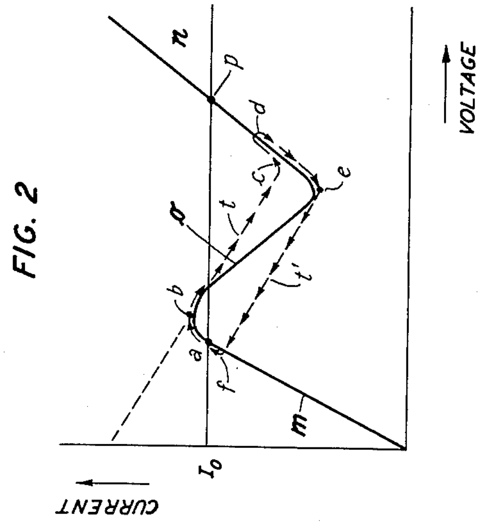
FIG. 2 is a characteristic curve explanatory of the operation of the regenerator depicted in FIG. 1.

To understand the operation of the regenerator, consider the characteristic curve of the controlled diode 20, as shown in FIG. 2. The curve attributable to the diode 20 displays a first region *m* of positive resistance terminated in a peak threshold *b*, a second region *n* of positive resistance commencing with a valley threshold *e* and an intervening region of negative resistance *o* between the thresholds *b* and *e*.

For regenerative action the current sources 18–1 and 18–2 are adjusted to provide an equilibrium current $I_0$ whose ordinate lies below the peak threshold *b* and above the valley threshold *e* of the diode characteristic. Assume that the pulse source 14 of FIG. 1 provides positive-going pulse signals; then the diode equilibrium operating point *a* is in the first positive region *m* of positive resistance. Under that circumstance, the diode 20 should operate as close to the peak threshold *b* as possible, without causing premature regeneration from spurious signals, in order to present an appreciable impedance to pulse signals propagated from the source 14.

From the standpoint of the regenerative transient effects initiated by pulse signals emanating from the source 14, the diode equilibrium point *a* may be taken as the origin of the current-voltage coordinates.

When a positive-going pulse signal arrives at the controlled diode 20, the voltage is developed both across the diode 20 and across the transient impedance of the transmission path 10. If the diode impedance is appreciable, as it will be if its equilibrium operating point *a* is close to the peak threshold *b* of the diode characteristic, substantially all of the pulse signal is developed across the diode 20 so that its current is quickly increased above the threshold *b*, whereupon regeneration is initiated and the diode current undergoes a substantially instantaneous excursion to the second region *n* of positive resistance along a locus determined by the transient load line *t*. Since the transient signal sees an impedance in both the forward and backward directions along the path 10, the slope of the transient load line *t* is the reciprocal of one-half of the magnitude of the characteristic impedance $Z_0$ of the path 10.

Figure 3:
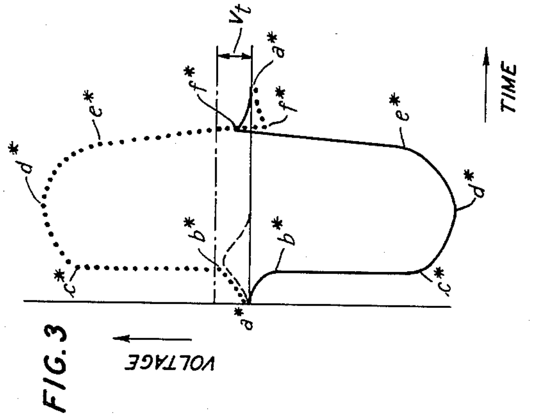
FIG. 3 is a diagram of typical waveforms for the various pulse signals associated with the regenerator of FIG. 1.

The signal effects manifested at the controlled diode 20 are represented in FIG. 3 by various waveforms whose asterisked markers *a** through *f** are to be associated with similar, unasterisked markers *a* through *f* on the closed-loop locus of FIG. 2.

Once the incoming signal, indicated by the dashed-line waveform in FIG. 3, exceeds the peak threshold *b* in FIG. 2 and causes the locus to reach the second region *n* of positive resistance, the controlled diode 20 launches the initial portions of solid-line and dotted-line waveforms (FIG. 3) that tend to propagate, respectively, in the forward direction and in the reverse direction along the transmission path 10 of FIG. 1.

Figure 4:
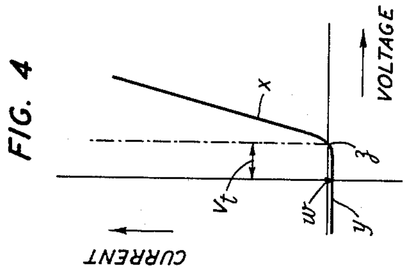
FIG. 4 is a characteristic curve explanatory of the operation of the reflector in the regenerator of FIG. 1.

After a time interval determined by the length of the line stretcher 13, the leading edge of the reversely propagated pulse reaches the reflector 11 whose current-voltage characteristic, set forth in FIG. 4, displays an interval of conduction, delimited by a region *x* of negligible impedance, and an interval of non-conduction, delimited by a region *y* of appreciable impedance. The two intervals are separated from each other at a threshold of conduction *z* near the knee of the characteristic.

Because of the equilibrium current that passes through the resistor in the biasing networks, a negative voltage is developed across the reflector diode 30. The biasing resistor 32 is adjusted to place the origin *w* of the reflector current-voltage characteristic sufficiently far below the threshold of conduction *z* that the incoming attenuated pulse signal is of insufficient magnitude to exceed the threshold level $V_t$, designated in both FIGS. 3 and 4. As a result, it is unaffected by the reflector 11, being capacitively bypassed and confronted with a substantial impedance by the reflector inductor 35 and the reflector diode 30.

However, the regenerated signal of the reverse propagation has an appreciable magnitude imparted from the energy supplied to the controlled diode 20 by the constant current sources 18–1 and 18–2. Consequently, the reverse signal exceeds the conduction-threshold voltage level $V_t$ considerably and drives the reflector diode 30 well into its region *x* of negligible impedance delimiting the conduction interval, whereupon the conductors 10–1 and 10–2 of the transmission path 10 are, in essence, short-circuited and so that the reverse propagated regenerated signal is reflected in the direction of the controlled diode 20. During the reflection interval the locus of FIG. 2 begins to ascend in the second region *n* of positive resistance seeking to attain the equilibrium position *p* determined by the current ordinate in that region corresponding to the steady current $I_0$ supplied by the current sources 18–1 and 18–2. However, when the reflected pulse signal arrives at the controlled diode 20, it causes the locus to abruptly turn downward and proceed in the direction of the valley threshold *e*, the attainment of which is marked by a rapid transition along a transient load line *t'* paralleling that described previously until the initial equilibrium position *a* is attained.

Again a comparison may be made between the regenerated waveforms of FIG. 3 and the closed-loop locus of FIG. 2. The duration of the regenerated pulse is determined by the duration of the locus in the second region *n*. This, in turn, is controlled by the time that it takes the reversely propagated pulse signals to be returned from the reflector 11, and, as such, is amenable to adjustment by varying the length of the line stretcher 13.

Numerous variations of the reflector, employed in conjunction with various adaptations of a negative resistance component incorporated into a transmission path, along with ways of controlling the duration of a reflector-regenerated pulse signal and with ways of energizing both the reflector and the negative resistance component, will occur to those skilled in the art.

What is claimed is:

1. Apparatus for deriving, at a load, inverted output pulse signals of controlled durations from input pulse signals supplied by a source, which comprises a transmission path interconnecting the source and the load, negative resistance means, included in said path and responsive to the input pulse signals, for launching inverted regenerated pulse signals forwardly along said path toward said load and for launching non-inverted regenerated pulse signals backwardly along said path toward said source, and means, included in said path between the source and said negative resistance means and affording through-passage to said input pulse signals, for reflecting said backwardly launched pulse signals whereby, after a duration dependent upon the spacing between said reflected pulse signals return to said negative resistance means and abruptly terminate its regenerative action.

2. Apparatus as defined in claim 1, wherein said negative resistance means comprises a voltage-controlled diode forwardly poled in the propagation direction of said input pulse signals.

3. Apparatus as defined in claim 1, wherein said reflecting means comprises means for effectively short-circuiting said path for said backwardly launched pulse signals.

4. Apparatus as defined in claim 3 wherein said short-circuiting means comprises a diode characterized by a signal interval of relative conduction and a contiguous signal interval of relative non-conduction, and means for completely biasing said diode beyond said interval of conduction into said interval of non-conduction for said output pulse signals and for partially biasing said diode into said interval of non-conduction for said backwardly launched pulse signals, whereby those portions of said backwardly launched pulse signals appearing in said interval of conduction cause said diode to appear as an effective short-circuit.

5. Apparatus for deriving an inverted and controlled-duration output pulse signal at a load from an input pulse signal originating at a source which comprises a dual-conductor transmission path interconnecting, at its extremities, the source and the load; first means, included in one of the conductors, displaying a current-voltage characteristic with a first region of positive resistance terminated in a peak threshold, a second region of positive resistance commencing with a valley threshold, and an intervening region of negative resistance linking the thresholds; energizing means, at said extremities, for causing said negative resistance means to adopt an initial position of stable equilibrium in said first region of positive resistance and to be capable of adopting an alternate position of stable equilibrium in said second region of positive resistance; second means, preceding said negative resistance means and interconnecting said conductors, displaying a current-voltage characteristic with a region of appreciable impedance separated from a region of negligible impedance at a threshold of conduction, and means, activated by said energizing means, for biasing said second means into said region of appreciable impedance and for shifting said threshold of conduction beyond the magnitude of the input pulse signal, whereby said input pulse signal, exceeding said peak threshold, causes a rapid transition in the signal condition of said first means through said region of negative resistance and launches an inverted, forwardly propagated signal of enhanced amplitude and a non-inverted, backwardly propagated signal that exceeds the threshold of conduction at said second means and is reflected therefrom with inversion of polarity to said first means where it depresses said signal condition, tending to attain said alternate position of stable equilibrium, below said valley threshold and returns said first means to said initial position of stable equilibrium, thus terminating said forwardly propagated signal.

6. Apparatus as defined in claim 5 further including means, positioned between said first means and said second means, for controlling the return time of said backwardly propagated signal, thereby to regulate the duration of the output pulse signal.

References Cited in the file of this patent

UNITED STATES PATENTS 2,830,199 Mofenson -------------- Apr. 8, 1958